(12) United States Patent
Neubauer et al.

(10) Patent No.: US 9,573,315 B2
(45) Date of Patent: *Feb. 21, 2017

(54) APPARATUS AND METHOD OF SHAPING PLASTICS MATERIAL PRE-FORMS INTO PLASTICS MATERIAL CONTAINERS WITH STRETCH BAR MOVEMENT SEALED OFF BY ROLLING DIAPHRAGM

(75) Inventors: Michael Neubauer, Regensburg (DE); Yasin Kerim, Koenigsbrunn (DE); Eduard Handschuh, Regensburg (DE)

(73) Assignee: KRONES AG (DE)

( * ) Notice: Subject to any disclaimer, the term of this patent is extended or adjusted under 35 U.S.C. 154(b) by 513 days.

This patent is subject to a terminal disclaimer.

(21) Appl. No.: 13/535,312

(22) Filed: Jun. 27, 2012

(65) Prior Publication Data

US 2012/0326359 A1 Dec. 27, 2012

(30) Foreign Application Priority Data

Jun. 27, 2011 (DE) .................. 10 2011 106 306

(51) Int. Cl.
*B29C 49/46* (2006.01)
*B29C 49/12* (2006.01)
(Continued)

(52) U.S. Cl.
CPC .............. *B29C 49/46* (2013.01); *B29C 49/12* (2013.01); *B29C 49/06* (2013.01); *B29C 49/36* (2013.01); *B29C 2049/4697* (2013.01)

(58) Field of Classification Search
CPC .......... B29C 49/46; B29C 49/06; B29C 49/12; B29C 2043/565; B29C 2049/4697; B29C 47/0073
(Continued)

(56) References Cited

U.S. PATENT DOCUMENTS 4,024,770 A * 5/1977 Liesenborghs ................ 74/18.2
4,946,366 A 8/1990 Dundas
(Continued)

FOREIGN PATENT DOCUMENTS

DE 10 2008 038 143 A1 2/2010
DE 102008035835.5 * 2/2010 .............. A61M 5/14
(Continued)

OTHER PUBLICATIONS

Extended European Search Report dated Sep. 4, 2014, issued in corresponding European Application No. 12173178.0.
(Continued)

*Primary Examiner* — Jeffrey Wollschlager
*Assistant Examiner* — Armand Melendez
(74) *Attorney, Agent, or Firm* — Hayes Soloway P.C.

(57) ABSTRACT

An apparatus for shaping plastics material pre-forms into containers includes a blow molding station on a movable conveying device. The station has a blow mold forming a cavity in which the pre-forms are expandable by a gaseous medium. A stressing device acts upon the pre-forms with the gaseous medium to expand them. A clean room surrounds the blow molding station at least in part. A stretching unit stretches the pre-forms along their longitudinal direction and includes a stretch bar movable with respect to the plastics material pre-forms. The stretch bar is insertable into the pre-forms. The station has a receiving space with a wall for receiving the stretch bar, which is movable relative to the receiving space and which surrounds the stretch bar at least in part. A flexible sealing device, which separates a sterile room area from a non-sterile room area, is arranged inside the receiving space.

19 Claims, 8 Drawing Sheets

(51) Int. Cl.
*B29C 49/06* (2006.01)
*B29C 49/36* (2006.01)

(58) Field of Classification Search
USPC ......... 264/533, 535, 532; 425/524, 540, 541
See application file for complete search history.

(56) References Cited

U.S. PATENT DOCUMENTS

| | | | | |
|---|---|---|---|---|
| 6,635,216 | B2 * | 10/2003 | Dundas et al. | 264/525 |
| 8,435,024 | B2 | 5/2013 | Dordoni | 425/210 |
| 8,632,325 | B2 * | 1/2014 | Voth et al. | 425/3 |
| 8,708,680 | B2 * | 4/2014 | Geltinger et al. | 425/3 |
| 8,985,990 | B2 * | 3/2015 | Martini | B29C 49/36 425/210 |
| 9,050,744 | B2 * | 6/2015 | Geltinger | B29C 49/12 |
| 2010/0015269 | A1 * | 1/2010 | Matsushita et al. | 425/143 |
| 2011/0133369 | A1 * | 6/2011 | Martini et al. | 264/523 |
| 2011/0133370 | A1 | 6/2011 | Engelhard et al. | 264/535 |
| 2011/0192489 | A1 * | 8/2011 | Pobitschka | 141/1 |
| 2011/0241265 | A1 * | 10/2011 | Schmidt | 264/532 |
| 2012/0326358 | A1 * | 12/2012 | Geltinger et al. | 264/532 |

FOREIGN PATENT DOCUMENTS

| | | | | |
|---|---|---|---|---|
| EP | 1 258 336 A1 | | 11/2002 | |
| IT | WO 2011030183 A1 | * | 3/2011 | ............. B29C 49/12 |
| JP | 2012500134 | | 1/2012 | ............. B29C 49/12 |
| JP | 2012500135 | | 1/2012 | ............. B29C 49/08 |
| JP | 2013504456 | | 2/2013 | ............. B29C 49/08 |
| WO | 2010/020529 A2 | | 2/2010 | |

OTHER PUBLICATIONS

Japanese Office Action issued in application No. 2012-140771, dated Oct. 22, 2015 (7 pgs).

* cited by examiner

APPARATUS AND METHOD OF SHAPING PLASTICS MATERIAL PRE-FORMS INTO PLASTICS MATERIAL CONTAINERS WITH STRETCH BAR MOVEMENT SEALED OFF BY ROLLING DIAPHRAGM

CROSS-REFERENCE TO RELATED APPLICATION

This application claims the benefit of priority of German Patent Application No. 10 2011 106 306.8, filed Jun. 27, 2011, pursuant to 35 U.S.C. 119(a)-(d), the disclosure of which is incorporated herein by reference.

TECHNICAL FIELD

The present disclosure relates to an apparatus and a method of shaping plastics material pre-forms into plastics material containers.

BACKGROUND

Apparatuses and methods of shaping plastics material pre-forms into plastics material containers have long been known from the prior art. An apparatus of this type for the shaping of plastics material pre-forms into plastics material containers, also referred to below as a stretch blow moulding machine, usually has a plurality of blow moulding stations in which the pre-forms are blow moulded into plastic bottles by the application of an internal pressure. These finished blow moulded plastics material containers are soiled after this process and have to be cleaned in a complicated manner afterwards in order to observe hygiene standards.

An important component of such a stretch blow moulding machine or of such a stretch blow moulding station respectively is the stretching unit. This supports and guides the stretch bar. The stretch bar moves into the plastics material pre-form and stretches it out as far as the base of the mould. The blow moulding pressure eventually shapes the bottle and the stretching unit moves back out of the finished bottle again.

It is known from the prior art for the stretching unit to be connected and guided on a linear guide by way of a moment slide or stretch slide. This is important since the stretch bar usually has to be guided centrally in a very precise manner over a very long stroke which amounts to up to 450 mm. The stretch slide in this case is driven in its known design by a linear motor. The latter is mounted centrally with respect to the stretching axis and moves in and out at very high speed.

It is also known for the stretch bars to be moved by way of a guide cam.

In the prior art the mechanism in a non-clean room is without any protection from contamination. This means that the ready shaped bottle is contaminated and so has to be cleaned hygienically in a separate module, such as a rinser.

A sterile blow moulding machine is known from WO 2010/020529 A2. The subject matter of this publication is hereby also made the subject of the present application by reference in its entirety.

At present no stretch blow moulding machines are known which produce plastic bottles which are blown aseptically. The mechanism and the "non-clean course" of the stretching process are similar in all the current machines on the market.

Therefore, it may be desirable to provide a stretch blow moulding machine which, in particular, also has a hygienically designed stretching unit.

SUMMARY

According to various aspects of the disclosure, an apparatus for the shaping of plastics material pre-forms into plastics material containers has at least one blow moulding station which is arranged on a movable conveying device, the blow moulding station having a blow mould and this blow mould forming a cavity in the interior of which the plastics material pre-forms are capable of being expanded by being acted upon with a gaseous medium in order to form the plastics material containers. In addition, the apparatus has a stressing device, which acts upon the plastics material pre-forms with a gaseous medium in order to expand them, as well as a clean room, which surrounds the blow moulding station at least in part, and a stretching unit, which stretches the plastics material pre-forms along their longitudinal direction. In this case the stretching unit has a stretch bar which is movable with respect to the plastics material pre-forms and which is capable of being inserted into the plastics material pre-forms.

According to some aspects, the blow moulding station has a receiving space with at least one wall for receiving the stretch bar, this receiving space surrounding the stretch bar at least in part and the stretch bar being movable with respect to this receiving space, and a flexible sealing device, which separates a sterile room area of the apparatus from a non-sterile room area of the apparatus, being arranged inside the receiving space.

It is therefore proposed that the stretch bar itself should move permanently in the clean room and should be sealed off from the non-sterile environment by means of the aforesaid sealing device. A procedure is known from the prior art in which the movement of the stretch bar is sealed off from the environment by means of a folding bellows. In terms of sterilization, however, this folding bellows is in part very awkward to clean. It is thus now proposed that a region of the stretch bar should be arranged inside a receiving space and that the movement should be sealed off by means of a flexible sealing device.

In the case of an exemplary embodiment the sterile room area—or the room area kept sterile—of the apparatus is connected in terms of flow to the above-mentioned clean room of the apparatus.

The drive device for moving the stretch bar can be for example a linear motor or electric motor respectively or a mechanical or hydraulic drive. It would also be possible, however, for the drive of the stretch bar to take place by way of a cam roller and a corresponding guide cam, in particular arranged in a stationary manner. This guide cam can be arranged in this case outside the clean room for example. The conveying device which conveys the blow moulding station or the blow mould respectively can be for example a blow moulding wheel which is arranged so as to be rotatable and on which a plurality of blow moulding stations of this type are arranged. It may also be advantageous for the stressing device to be arranged inside the clean room and to be moveable relative to the containers to be expanded.

In the case of an exemplary embodiment the stretch bar is arranged on a holding device and this holding device extends through a wall of the receiving space.

In the case of an exemplary embodiment the sealing device is designed in the form of a rolling diaphragm. In this case it is possible for an area of this rolling diaphragm to be arranged on an area of the stretch bar or an area movable with the stretch bar and for a further portion to be arranged in an area of the aforesaid housing. A rolling diaphragm of this type is suitable for nevertheless producing a seal in particular in the case of comparatively large reciprocating movements, such as the movements of the stretch bar here. In this way, the stretch bar is sealed off in a hygienic manner by the aforesaid rolling diaphragm.

In the case of an exemplary embodiment a higher pressure is present in the aforesaid sterile room area of the apparatus in a working operation of the apparatus than in the non-sterile room area. It may be advantageous for the pressure difference between the sterile area and the non-sterile area to amount to between 0.2 bar and 4 bar, in some aspects to between 0.3 bar and 3 bar and, in some aspects, to between 0.5 bar and 2 bar.

On account of this difference in pressure it is possible for a fold of the aforesaid rolling diaphragm to be formed in an improved manner, in particular during the movement. In addition, it can be made possible as a result for the rolling diaphragm to rest in a uniform manner on a carrier, such as for example an inner and outer cylinder as described in greater detail below. In this case, as mentioned above, this area of higher pressure is filled with sterile air and in this way non-sterile air is prevented from being able to pass into the sterile area in the event of a crack in the diaphragm. During the sterilization of the apparatus as a whole the aforesaid sterile area including any sterile air lines for this area is also sterilized. With this design a pressure equalization container can be provided.

In the case of an exemplary embodiment the apparatus therefore has a reservoir for maintaining the pressure in the sterile area, which reservoir is connected in terms of flow to the sterile area. In this case it is possible for a reservoir to be associated with a plurality of blow moulding stations, but it would also be possible for a reservoir to be associated with one blow moulding station in each case or for a reservoir to be associated with all the blow moulding stations.

In the case of an exemplary embodiment the apparatus has a drive device for moving the stretch bar along the longitudinal direction thereof, and this drive device is arranged outside the clean room. This drive device can be for example a linear motor, but, as mentioned above, it would also be possible for guide cams to be used.

In the case of an exemplary embodiment the sealing device has a first end portion arranged in a stationary manner in the direction of movement of the stretch bar and a second end portion movable in the direction of movement of the stretch bar. In this case an end portion may be understood to be those areas of the rolling diaphragm which are situated in the last or in the outermost 20% of the rolling diaphragm, in some aspects in the outermost 10% and, in some aspects, in the outermost 5% of the rolling diaphragm.

In this case it is possible for the movable end portion of the rolling diaphragm to move jointly with the stretch bar and to be arranged for example on an area of the stretch bar itself or even on a carrier of the stretch bar. It may be advantageous in this case for the rolling diaphragm to be arranged in a releasable manner on the aforesaid carrier of the stretch bar. In addition, the rolling diaphragm may be advantageously arranged in a releasable manner with its second end portion on an element such as the housing.

In the case of an exemplary embodiment the second end portion is situated in the longitudinal direction for a time above the first end portion and for a time below the first end portion. If for example the stretch bar is introduced completely into the plastics material pre-form in order to stretch it, the movable end portion may be advantageously situated below the end portion arranged stationary if the plastics material pre form or the container respectively is situated below the stretch bar. Embodiments are also known, however, in which the stretch bar is introduced into the container from below. In these cases the movable end portion may be preferably situated above the end portion arranged stationary in a state of the stretch bar introduced into the container. It may be advantageous for the aforesaid second end portion to be situated both for a time above the first end portion and for a time below the first end portion. It may be advantageous for the amplitude of the movable end portion to be substantially constant with respect to the first end portion on both sides or for the respective distances from the stationary end portion in the longitudinal direction to differ by at most 20%.

In the case of an exemplary design the first end portion is arranged on the housing.

In the case of an exemplary embodiment the apparatus has at least one abutment area on which the sealing device rests flat at least for a time. On account of this abutment area it is possible for the rolling diaphragm to be able to follow the movements of the stretch bar with little wear and also to be able to be acted upon with comparatively high pressures.

It would additionally also be possible for the apparatus to have two abutment areas, so that the sealing device would be able to rest both against an inner abutment area and against an outer abutment area.

In the case of an exemplary embodiment the sealing device surrounds a room filled with a gaseous medium and separates it from the environment. With this arrangement the rolling diaphragm or the sealing device respectively can be designed in the manner of a hose and, in some aspects, can have a sort of entrainment means on the outside. With the aid of these entrainment means, which can be designed for example in the form of nibs, the rolling diaphragm may be advantageously secured to the housing on one side and to a stretch bar receiving means on the other side. In this case the region with the higher pressure forms a completely closed region and may be advantageously acted upon with sterile air at a constant pressure, in which case contamination of sterile areas can in turn be prevented by this constant over-pressure.

The above-mentioned reservoirs or pressure equalization containers can be designed in this case in such a way that in the case of a rolling diaphragm in a normal design they change their respective volume in a manner dependent upon the position of the stretch bar. In order that the pressure should remain approximately constant in this area, a pressure equalization container is proposed in this case. While the stretch bar moves downwards in order to extend the plastics material pre-form, sterile pressure is forced out of the aforesaid non-sterile area into the reservoir and, as it moves upwards, the sterile air moves back out of the reservoir into the sterile area. The volume of this reservoir is selected in this case in such a way that during the entire stroke of the stretch bar the pressure does not exceed the pressure boundary values (which may advantageously be between 0.5 bar and 2 bar). These pressure equalization containers or reservoirs respectively and the connecting lines may be advantageously designed in a hygienic manner in their interior and can be sterilized. A variant may also be advantageously suitable for sterilization. In this case it is possible for example for a sterilization medium to be introduced through an air socket of the pressure equalization container.

It would furthermore also be possible for connecting lines to be provided between individual blow moulding stations and the sterile rooms thereof, for example for the over-pressure which occurs by a movement of the stretch bar downwards to be compensated by a change in pressure at a blow moulding station in which the stretch bar is just being withdrawn.

In the case of an exemplary embodiment the receiving space is made substantially cylindrical. The stretch bar is guided inside this cylinder. It may be preferable for the stretch bar to be arranged centrally in this cylinder, i.e. for its direction of movement to coincide with an axis of symmetry of the cylinder.

The present disclosure further relates to a method of shaping plastics material pre-forms into plastics material containers, in which the plastics material pre-forms are conveyed with at least one blow moulding station, which is arranged on a movable conveying device, through a clean room and are acted upon with a gaseous medium (and in particular air) at least for a time during this conveying in order to expand them. In addition, the plastics material pre-forms are stretched by means of a stretch bar in their longitudinal direction, in which case the stretch bar is moved with respect to the plastics material pre-forms in the longitudinal direction.

According to the disclosure the stretch bar is moved at least in part inside the receiving space, and inside the receiving space a sterile room area is separated from a non-sterile room area by means of a sealing device.

It is therefore proposed in terms of the method that a sealing of the stretch bar or of the movement of the stretch bar respectively should be carried out by the above-mentioned sealing device which is arranged inside the receiving space.

It may be advantageous for an end portion of the sealing device to move with respect to another end portion of the sealing device in the longitudinal direction of the movement of the stretch bar.

Further advantages and embodiments will become evident from the attached drawings.

DETAILED DESCRIPTION

Figure 1:
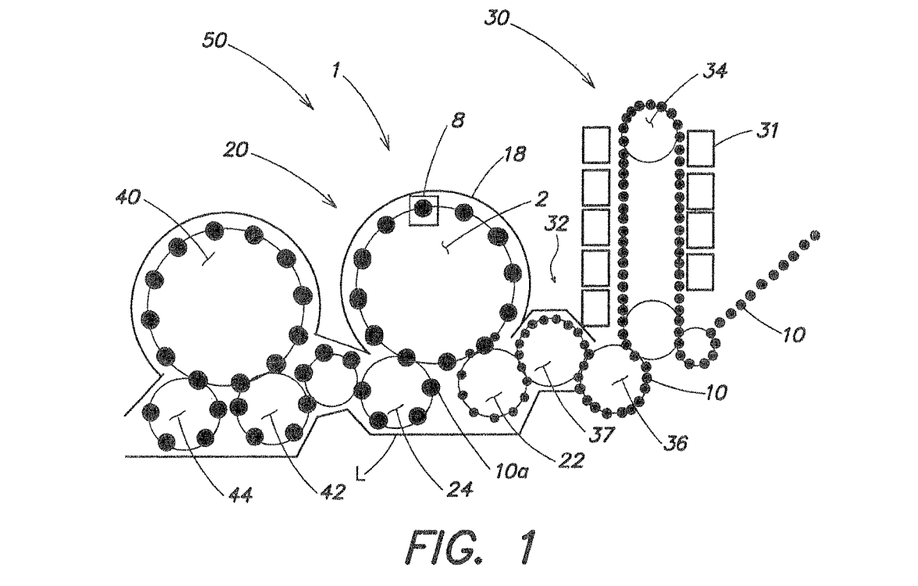
FIG. 1 is a diagrammatic illustration of a plant for producing plastics material containers in accordance with various aspects of the disclosure.

FIG. 1 is a diagrammatic illustration of a plant for producing plastics material containers according to the prior art. This plant 50 has a heating device 30 in which plastics material pre-forms 10 are heated. In this case these plastics material pre-forms 10 are conveyed through this heating device 30 by means of a conveying device 34, such as a circulating chain here, and are heated in this case by a plurality of heating elements 31. This heating device 30 has attached to it a transfer unit 36 which transfers the pre-forms 10 to a sterilization device 32. This sterilization device 32 likewise has in this case a conveying wheel 37 and sterilization elements can be arranged on this conveying wheel 37 or even in a stationary manner. Sterilization by hydrogen peroxide gas or even by electromagnetic radiation is possible for example in this region. In particular, an internal sterilization of the pre-forms is carried out in this region.

The reference number 20 designates in its entirety a clean room, the external boundaries of which are indicated here by the dotted line L. In an exemplary embodiment the clean room 20 is not only arranged in the region of the conveying wheel 2 and the filling device 40, but it already starts if possible in the region of the heating device 30, the sterilization device 32, the supply of the plastics material pre-forms and/or the production of the plastics material pre-forms. It is evident that this clean room 20 starts in the region of the sterilization unit 32. Separating-out devices can be provided in this region in order to introduce the plastics material pre-forms into the clean room 20 without too much gas flowing inside the clean room in this case and thus being lost.

As indicated by the broken line L, the clean room is adapted to the external shape of the individual components of the plant. In this way the volume of the clean room can be reduced.

The reference number 1 designates a shaping apparatus as a whole, in which a plurality of blow moulding stations or shaping stations 8 are arranged on a conveying wheel 2, only one of these blow moulding stations 8 being shown here. The plastics material pre-forms 10 are expanded by these blow moulding stations 8 to form containers 10a. Although it is not shown in detail here, the entire area of the conveying device 2 is not situated inside the clean room 20, but the clean room 20 or isolator is designed as it were in the form of a mini isolator inside the apparatus as a whole. In this way it would be possible for the clean room to be designed in the form of a duct at least in the region of the shaping apparatus 1.

The reference number 22 relates to a supply device which transfers the pre-forms to the shaping device 1, and the reference number 24 relates to a removal device which removes the plastics material containers 20 produced from the shaping apparatus 1. It will be seen that in the region of the supply device 22 and the removal device 24 the clean room 20 has recesses in each case which receive these devices 22, 24. In this way, a transfer of the plastics material pre-forms 10 to the shaping apparatus 1 or a receiving of the plastics material containers 10a from the shaping apparatus 1 can be carried out in a particularly advantageous manner.

The expanded plastics material containers are transferred to a filling device 40 by a transfer unit 42 and they are then removed from this filling device 40 by way of a further conveying unit 44. In this case the filling device 40 is also situated inside the aforesaid clean room 20. In the case of the filling device it would also be possible for the entire filling device 40 with for example a reservoir for a beverage not to be arranged completely inside the clean room 20, but also in this case only those areas in which the containers are actually guided. In this respect, it would also be possible for the filling device to be designed in a similar manner to the apparatus 1 for shaping plastics material pre-forms 10.

As mentioned, the clean room 20 is reduced in the region of the apparatus 1 to as small an area as possible, namely essentially to the blow moulding stations 8 themselves. As a result of this compact design of the clean room 20 it is possible in an easier and more rapid manner to produce a clean room generally and, in addition, a lower outlay is required in order to keep the system sterile in the operative phase. Less sterile air is also necessary, and this leads to smaller filter units and the risk of uncontrolled swirl formation is also reduced.

Figure 2:
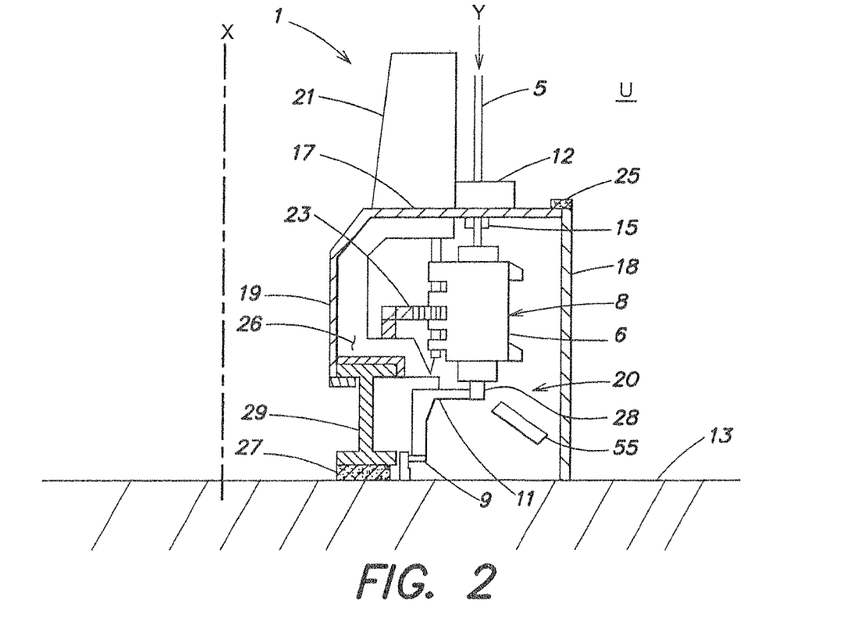
FIG. 2 is a view of a clean room in the region of a blow moulding station.

FIG. 2 is a detailed illustration of the apparatus 1 according to the prior art in the region of a blow moulding station 8. A plurality of blow moulding stations 8 of this type are moved by a conveying device 2 or a carrier so as to rotate about an axis X. As is evident from FIG. 2, the blow moulding station 8 is guided inside the clean room 20 which is designed in the form of a duct here. This clean room 20 is closed off by a movable lateral wall 19 and a cover 17 formed in one piece with this lateral wall 19. In this case this lateral wall 19 and the cover 17 rotate jointly with the blow moulding station 8.

The reference number 18 relates to a further wall which bounds the clean room 20. This wall 18 is here a wall which is situated on the outside and which is arranged in a stationary manner. The cover 17 and the wall 18 have provided between them a sealing device 25 which seals off from each other the elements 17 and 18 movable with respect to each other, for example, as mentioned above, by using a surge chamber. The lower region of the wall 18 is arranged on a floor 13 in a fixed and sealed manner. A carrier 26, which likewise moves in a rotating manner and on which a holding device 23 which holds the blow moulding station 8 is in turn provided, is provided inside the clean room 20 and in this case abutting directly against the wall 19.

The reference number 11 relates to a follower device which can be actuated by a guide cam 9 in order to open and close the blow moulding station on its path through the clean room 20, in order in particular to introduce the plastics material pre-form into the blow moulding station and also to remove it again. In this case a guide cam 9 is also arranged inside the clean room 20. It would also be possible, however, for a portion 11 below the individual blow moulding stations 8 to be brought out of the clean room 20.

The conveying device 2 can have still further elements which are arranged above the clean room 20.

In this case the carrier 26 is arranged in a fixed manner on a holding body 29 and this holding body in turn is movable with respect to the floor 13. In this case the reference number 27 relates to a further sealing device which in this area too seals off the regions 13 and 29 which are movable with respect to each other.

The reference number 5 relates to a stretch bar which is movable with respect to the blow moulding station in order to stretch the plastics material pre-forms 10 in their longitudinal direction. In this case a slide 12 opposite which the stretch bar is movable in the direction Y is arranged on the cover 17. The reference number 21 relates to a further holding means for this slide 12 of the stretch bar 5.

It is evident that specific regions of the stretch bar are both outside the clean room 20 and inside the clean room 20 during the blow moulding procedure. For this purpose it is possible for a protective device such as a folding bellows 14 to be provided outside the clean room 20 or above the slide 12, the folding bellows 14 surrounding the stretch bar 5 so that no region of the stretch bar 5 comes directly into contact with the outer environment. The reference letter U designates the (non-sterile) environment of the clean room 20. The reference number 28 designates a carrier for carrying a floor mould which likewise forms a component of the blow mould. This carrier is likewise movable in the direction Y in this case.

The reference number 55 relates to a sterilization device which in this case may be preferably arranged in the interior of the clean room 20 and is used for the sterilization of the individual shaping stations or components of these shaping stations 8. This sterilization device 55 can act in this case upon the shaping stations 8 for example with hydrogen peroxide or another sterilization agent. In this case the sterilization device 55 can be arranged so as to be stationary and the shaping stations can move with respect to this sterilization device 55. This sterilization device or stressing device 55 can be situated on the conveying wheel 2 or on the vertical wall 18 or can be arranged so as to be generally stationary and can consist of nozzles or the like. In addition, it may be advantageous for sterile air to be introduced into the clean room 20 in order to sterilize the clean room 20 by way of the aeration system.

The blow moulds (not shown) are arranged inside the blow mould carriers 6. More precisely, two blow mould carrier parts can be provided in this case which are pivotable with respect to each other and which hold one blow mould part in each case. The blow moulds can be opened by this pivoting procedure for the introduction of plastics material pre-forms and for the removal of finished, blow-moulded containers. These blow mould carriers and blow moulds are likewise arranged inside the clean room in this case.

It may also, however, be possible and preferred (other than as shown in FIG. 2) for the conveying device 2 or the carrier to have a C-shaped external periphery which also forms the outer walls of the clean room in part. In this way, this C-shaped clean room wall turns with the conveying device 2, i.e. the blow moulding wheel. In this embodiment the lower boundary of the clean room is arranged at a distance from the floor 13 and moves relative to the floor. In this way, the clean room can be made even smaller than as shown in FIG. 2. In this case it may be preferable for this C-shaped profile of the conveying device, which forms both an inner wall and a lower and upper cover of the clean room here, to be sealed off only with respect to the outer wall of the clean room. This outer wall may be preferably arranged in a stationary manner in this case.

Figure 3:
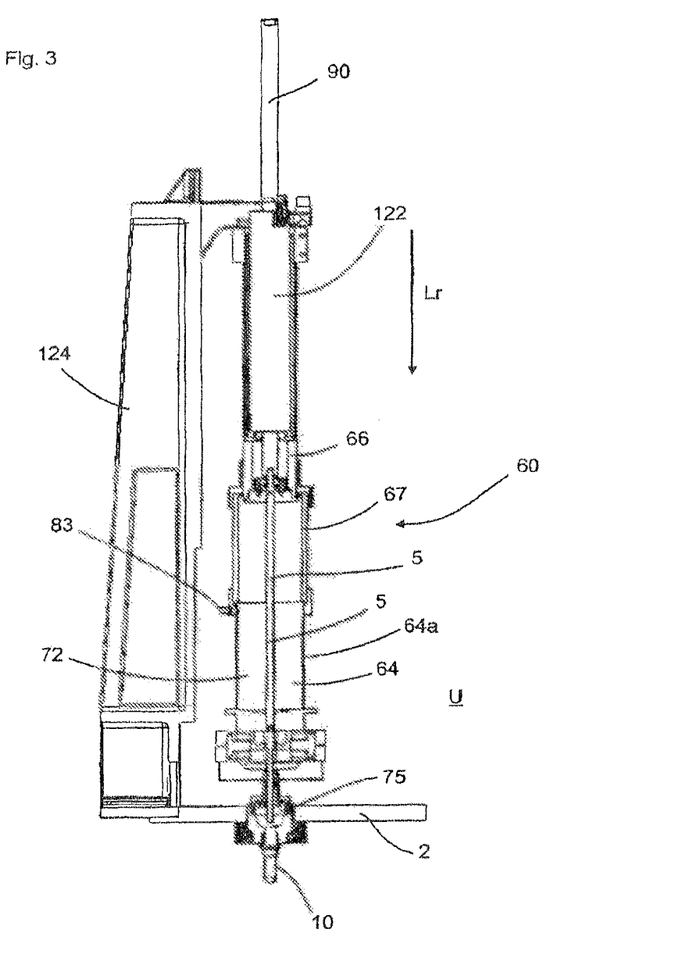
FIG. 3 is a side view of an exemplary stretching unit according to the disclosure.

FIG. 3 is a side view of a stretching unit 60 according to the invention. This stretching unit 60 has in this case a receiving space which is designated 64 in its entirety and inside which the stretch bar 5 moves in the direction of the arrow Lr. This receiving space surrounds the stretch bar substantially completely in this case. The reference 64a relates to a wall which is continuous here and which separates this receiving space 64 from the environment. The stretch bar 5 is used for stretching the plastics material pre-form 10 in the longitudinal direction thereof which coincides with the direction Lr here. At the same time the plastics material pre form is expanded with the aid of a blow moulding nozzle 75 by being acted upon with blowing air inside a blow mould (not shown).

The reference number 124 designates a carrier on which is arranged a drive device 122, such as a linear drive in this case. This linear drive 122 moves a carrier 90 on which a cylinder 66 in turn is arranged. The sealing device (not shown in detail here) is also arranged on this cylinder, in which case the sealing device is designed in the form of a rolling diaphragm. The reference number 67 designates a further cylinder, in this case an outer cylinder, which is used to support the rolling diaphragm. The rolling diaphragm is arranged on this cylinder 67 in a stationary manner in the longitudinal direction Lr. In addition, the cylinder 67 is stationary in the direction Lr. The reference number 83 relates to an opening for filling the receiving space 64 with a pressure medium and, in particular, with sterile air.

Figure 4A:
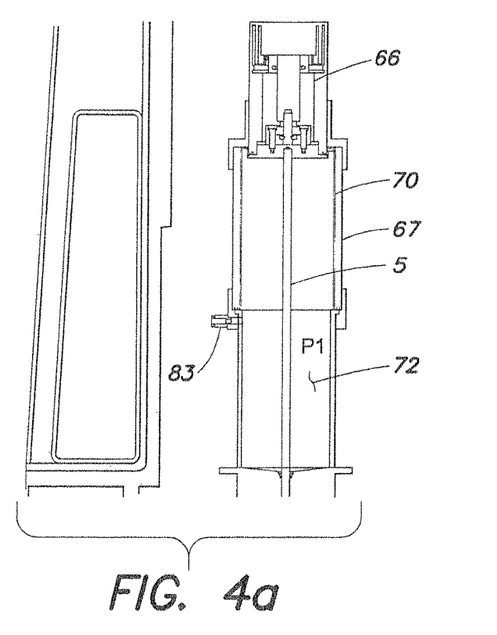
FIGS. 4a, 4b are an enlarged illustration of a stretching unit.

FIG. 4a is a detailed illustration of the apparatus shown in FIG. 3. The outer cylinder 67, on which one end of the rolling diaphragm 70 is arranged, is again evident here. The reference number 72 designates a sterile room which is demarcated here by the rolling diaphragm 70. An air pressure P1 is present inside this sterile room area 72.

Figure 4B:
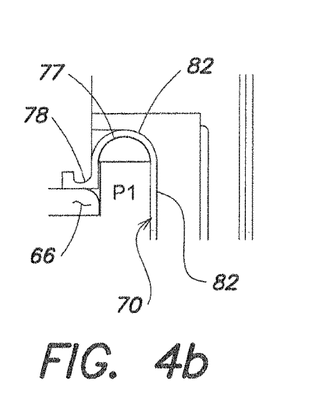

FIG. 4b is an enlarged illustration of the upper area of the sealing device 70. It will be seen that the sealing device 70 is arranged with an end portion 78 in a fixed manner on the cylinder 66 and thus moves jointly with the stretch bar 5. The reference number 77 designates a fold of the rolling diaphragm which likewise moves jointly in the longitudinal direction Lr in a manner dependent upon the movement of the stretch bar 5. The reference number 82 designates in each case an abutment face (which for the most part is situated radially outside the rolling diaphragm) on which the rolling diaphragm is supported from the outside so as to be able to absorb the pressure P1 in this way. As mentioned above, this sterile room area is acted upon with a pressure P1 which is higher than a pressure P2 outside this rolling diaphragm.

Figure 5A:
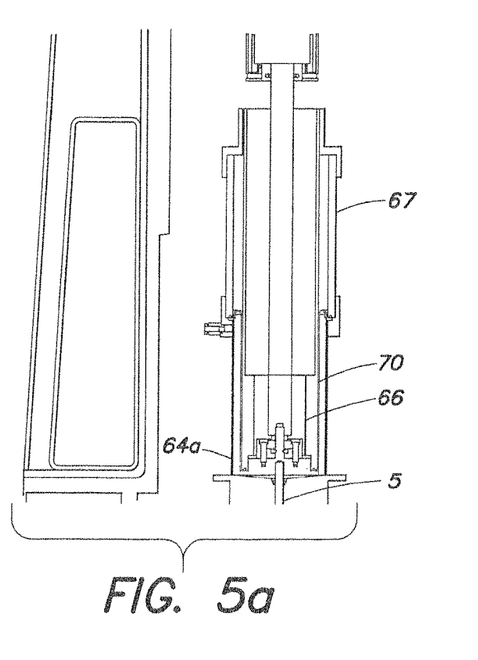
FIGS. 5a, 5b are a further enlarged illustration of the stretching unit shown in FIG. 3 in a lower position of the stretch bar.

FIG. 5a is a further illustration of the apparatus shown in FIG. 3, but in this case in a lower position of the inner cylinder 66, i.e. in a position in which the stretch bar is introduced completely into the plastics material pre-form. It will be seen that the inner cylinder 66, on which the stretch bar 5 is arranged, is arranged in the lower position and the sealing device 70 is also arranged in its lower position in a corresponding manner.

Figure 5B:
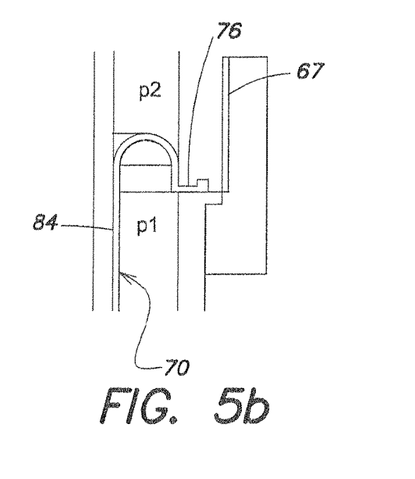

FIG. 5b is an enlarged illustration of the end portion 76—stationary in this case—of the sealing device 70 which is arranged on the outer cylinder 67. The pressure region P1 of the sterile room area 72, which is present in the region of the stretch bar, and the pressure P2, which is lower and is present above the sealing device 70, are again evident here. The reference number 84 designates in this case an inner abutment face against which the rolling diaphragm rests in this state and with respect to which the rolling diaphragm is supported. This abutment face is situated radially inside the rolling diaphragm.

Figure 6:
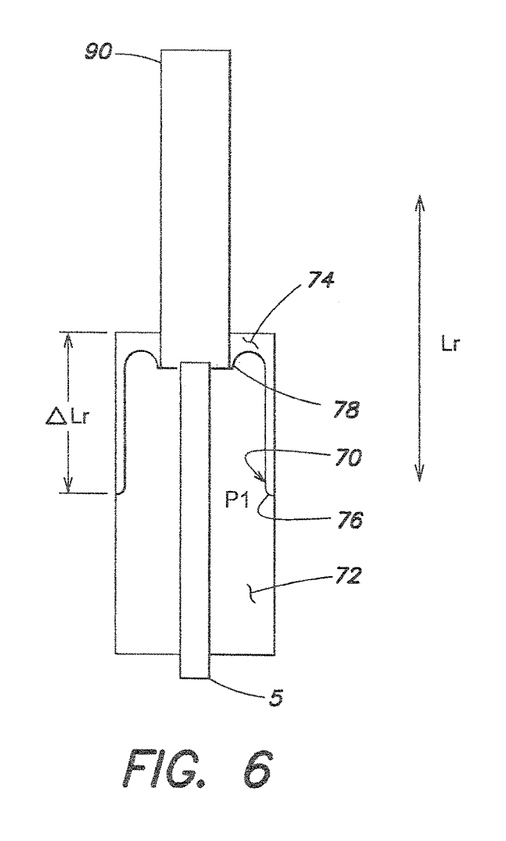
FIG. 6 is a diagrammatic illustration in an upper position of the stretch bar.

FIG. 6 is an enlarged illustration of this state of affairs. In this case the stretch bar 5 is again in its upper position and the pressure region P1 in the sterile room area 72 is evident once more. Here too the two end portions 76 and 78 of the sealing device 70 will be seen, in which case, as mentioned above, the end portion 76 is immovable in the longitudinal direction Lr and the end portion 78 is movable. The reference number 90 designates once more in a roughly diagrammatic manner the carrier on which the stretch bar is arranged. The reference $\Delta Lr$ indicates the amplitude by which the stretch bar is deflected upwards in this case, i.e. by which the movable end portion 78 is deflected upwards with respect to the stationary end portion 76. A non-sterile room area 74 with a pressure P2 is once again situated above the sealing device 70.

Figure 7:
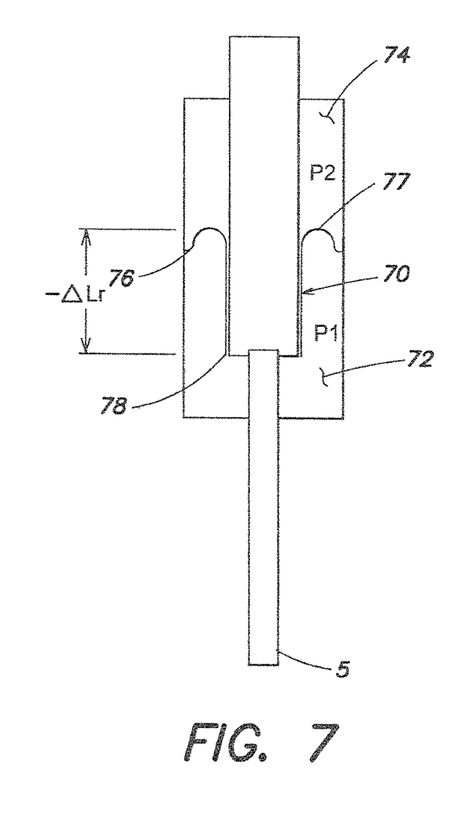
FIG. 7 is a diagrammatic illustration in a lower position of the stretch bar.

FIG. 7 shows the same situation as in FIG. 6, except that in this case the stretch bar is in its lower position. Here too the sealing device 70 with the fold 77 and the sterile room area 72 and the non-sterile room area 74 are evident. The two pressures P1 and P2 are again shown. The two end portions 76 and 78 of the sealing device are evident once again. In addition, it will be seen here that the carrier 90 is now deflected downwards with respect to the end portion 76, i.e. there is a deflection $-\Delta Lr$ downwards. It may be advantageous for the deflections $\Delta Lr$ and $-\Delta Lr$ to differ in magnitude by not more than 40% from each other, in some aspects by not more than 30% from each other, in some aspects by not more than 20% from each other, and, in some aspects, by not more than 10% from each other.

Figure 8A:
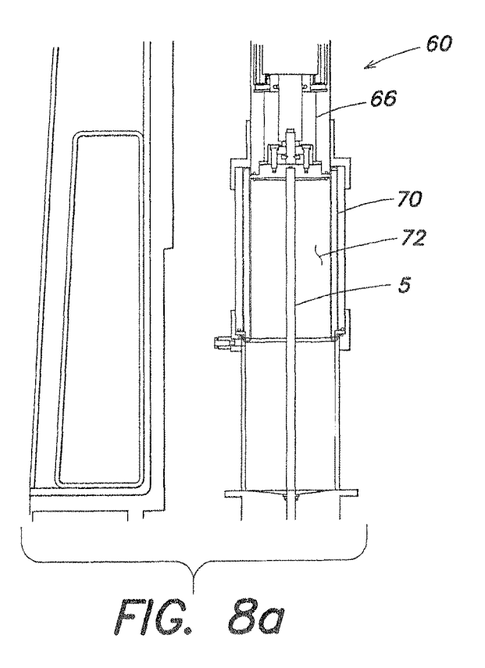
FIGS. 8a-8c are three detailed illustrations of the stretching unit.
Figure 8B:
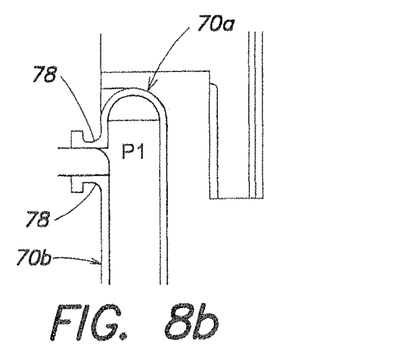
Figure 8C:
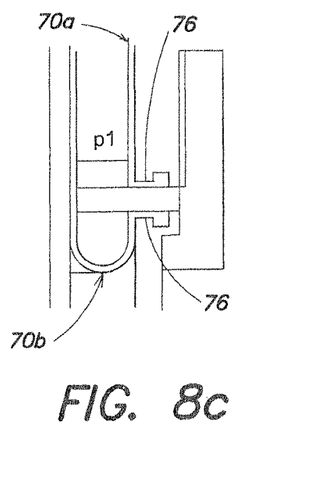

FIG. 8a shows a further embodiment of an apparatus according to the invention. Two rolling diaphragms 70a, 70b (cf. FIGS. 8b and 8c), which are designed similarly and which move jointly with each other in a corresponding manner, are provided as a sealing device 70 here. In this case a volume with the pressure P1 is present inside an intermediate space between these two rolling diaphragms. This volume, in which the pressure P1 prevails, remains substantially constant in this case during the entire movement of the stretch bar, so that this volume can be acted upon at a constant pressure with sterile air. In the case of this embodiment it is possible to dispense with a pressure equalization container or a reservoir.

Figure 9:
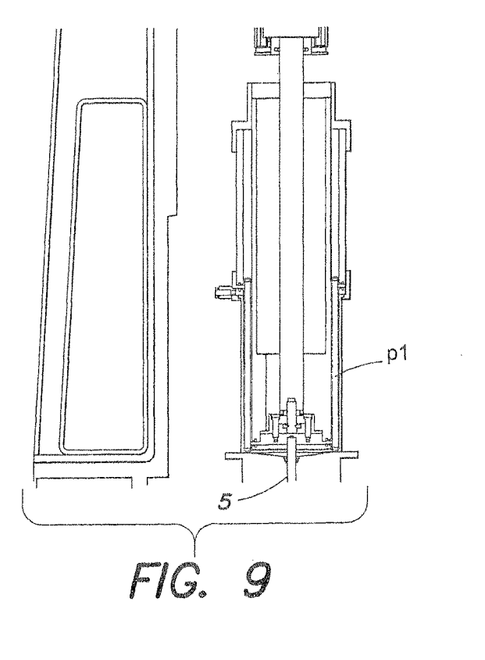
FIG. 9 is a further illustration of the stretching unit in a lower position of the stretch bar.

FIG. 9 is an illustration in which the stretch bar 5 is situated in the lower position, and therefore the sealing device 70 or the two rolling diaphragms 70a and 70b is or are also in the lower position.

Figure 10:
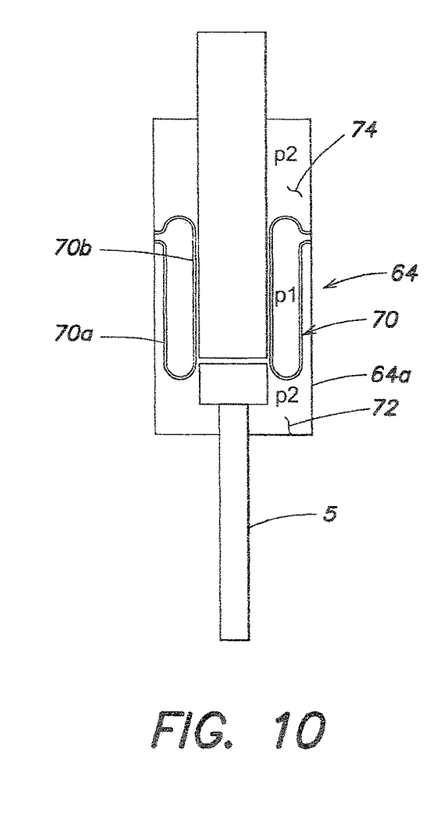
FIG. 10 is a diagrammatic illustration of a stretching unit in an exemplary embodiment.
Figure 11:
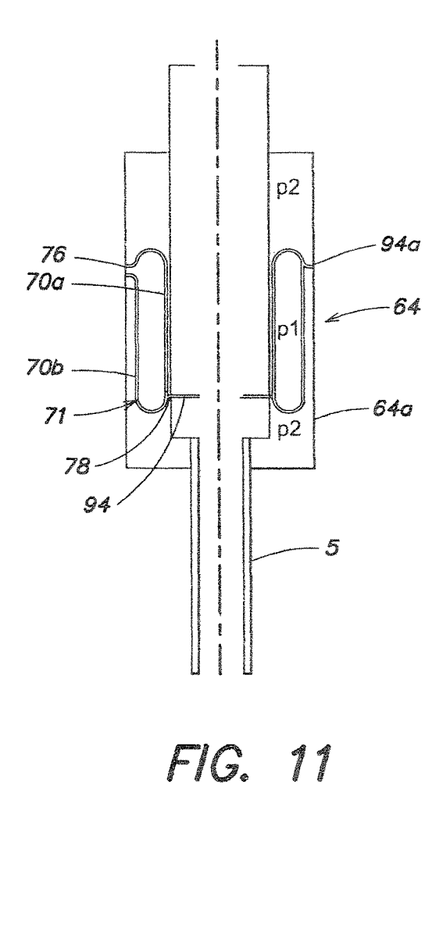
FIG. 11 is a detailed illustration of an exemplary stretching unit.

FIGS. 10 and 11 illustrate this state of affairs. In this case a rolling diaphragm is once more illustrated in the lower position in FIG. 10, and it will be seen that a pressure P1 is present inside the sealing device, i.e. between the rolling diaphragms 70a and 70b, and a pressure P2 is present outside these rolling diaphragms 70a, 70b. In this case, however, the lower region P2, i.e. the region situated below the rolling diaphragm, is a sterile region, whereas the upper region, i.e. the region P2 situated above the rolling diaphragms, is a non-sterile region. In the case of the variant shown in FIG. 10 the two rolling diaphragms 70a and 70b are clamped with respect to each other.

FIG. 11 shows a further variant in which a sealing device in the manner of a slotted hose 71 is provided here. In this case this hose can be slotted on the outside, i.e. in its region 76, as a result of which this slot can also be used as a pressure medium attachment. In the interior an entrainment means 94 in the form of a nib is illustrated, on which is arranged the second end portion 78 or the movable end portion 78 of the sealing device 70. The reverse variant is illustrated on the right-hand side in FIG. 11, i.e. the sealing device 70 is slotted on the radial inner side here and the entrainment means 94a is situated radially on the outside, i.e. on the housing.

Figure 12A:
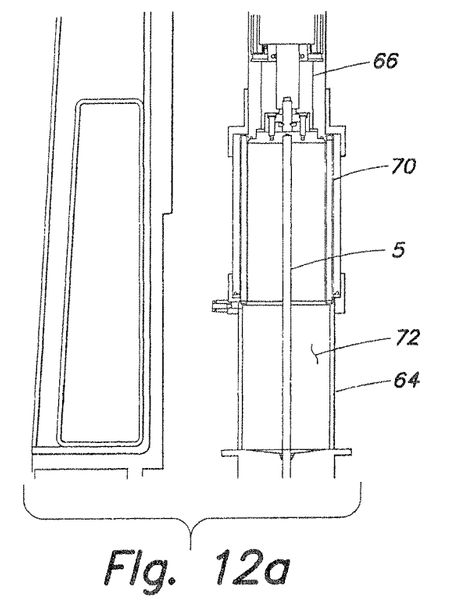
FIGS. 12a, 12b are two further illustrations of the stretching unit shown in FIG. 10.

FIG. 12a shows a further embodiment of an apparatus according to the invention, in which case the rolling diaphragm or the sealing device 70 respectively is designed in the form of a hose. In this case a sort of entrainment means in the form of a nib, by way of which compressed air can be supplied to the diaphragm 70, i.e. the sealing device, is provided on the outside here.

Figure 12B:
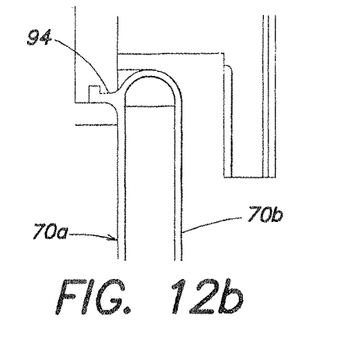

FIG. 12b is once again a detailed illustration, in which case the two partial areas 70a and 70b of the sealing device 70 are again evident. The entrainment means 94, by which the sealing device is arranged on the outside, is again likewise evident. It would be possible in this case for the region inside the rolling diaphragm, which is acted upon with the pressure P1, to be closed completely or even to be open on one side. The reference number 72 once again designates the sterile room area.

Figure 13:
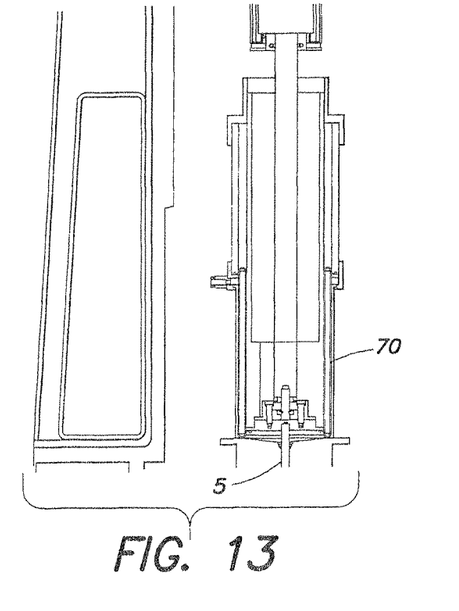
FIG. 13 is an illustration of the stretching unit as shown in FIG. 10 in a lower position of the stretch bar.
Figure 14:
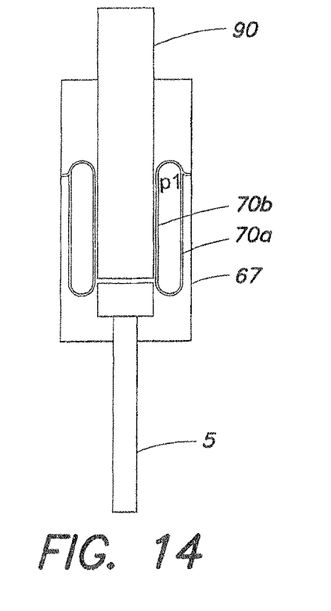
FIG. 14 is a further diagrammatic illustration of a stretching unit.

FIG. 13 shows the apparatus from FIG. 12a, in which case, however, the stretch bar 5 is once more in a lower position. The sealing device 70 is also deflected downwards in a corresponding manner. This situation is once again illustrated in a diagrammatic manner in FIG. 14. In this case too, a pressure P1 is present inside the sealing device 70. This region of the sealing device is filled with a sterile medium. Once more the sterile area is provided below the sealing device and the non-sterile area is provided above the sealing device 70. In the case of this embodiment it is possible to provide both an entrainment means with which the sealing device is arranged on the carrier 90, and an entrainment means with which the sealing device is arranged on the housing 67. In the situation illustrated in FIG. 14, the sealing device 70 completely surrounds a volume under the pressure p1 and, in particular, in a manner impermeable to air. In this case too, it may be preferable for the pressure p1 inside the sealing device 70 to be higher than a pressure p2 outside the sealing device 70.

Figure 15:
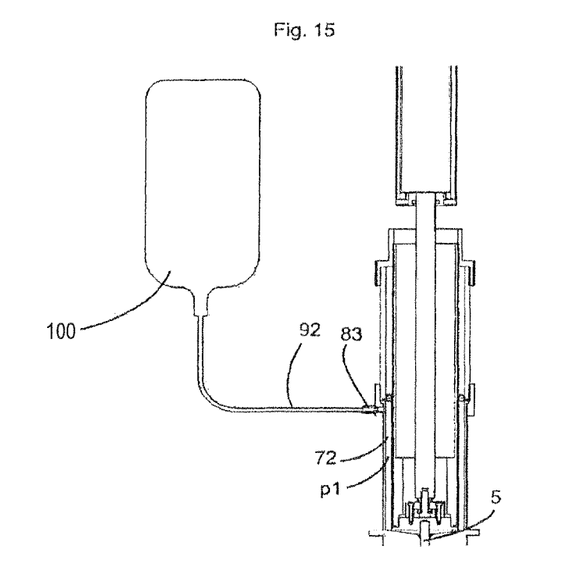
FIG. 15 is an illustration of a stretching unit with an equalization reservoir.

FIG. 15 is an illustration to explain the pressure equalization. It will be seen that in this case a gaseous medium, such as for example sterile air, is supplied by way of the attachment 83 to the stretching unit 60 by way of a supply line 92 out of a reservoir 100. This reservoir 100 in which the pressure P1 is likewise present has the effect that the same pressure is present at least for a time inside the sterile room area 72 independently of the position of the stretch bar 5. For this purpose the reservoir 100 may be advantageously considerably larger in its volume than the volume of the sterile room area 72.

FIGS. 16a to 16d show four possible designs for arranging pressure reservoirs. In the case of the arrangement shown in FIG. 16a a reservoir 100 is associated in each case with each sterile room area 72 and these reservoirs 100 are connected to one another by way of a connecting line 92.

Figure 16A:
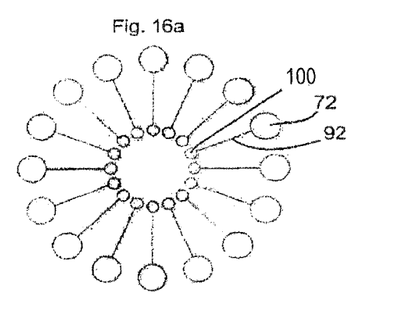
FIGS. 16a-16d show four possible arrangements for reservoirs.
Figure 16B:
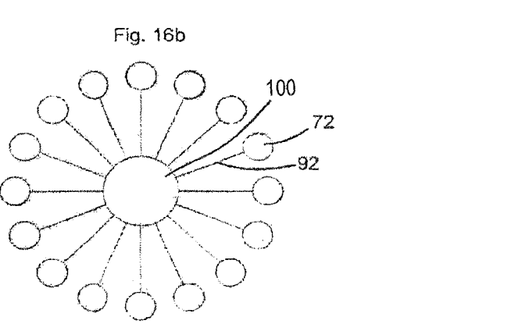

In the case of the situation shown in FIG. 16b a central reservoir is provided, which is connected to the individual sterile room areas 72 by way of a plurality of supply lines 92. In this case it is also possible for the varying changes in volume of the room areas 72 to be compensated in each case by the central reservoir 100.

Figure 16C:
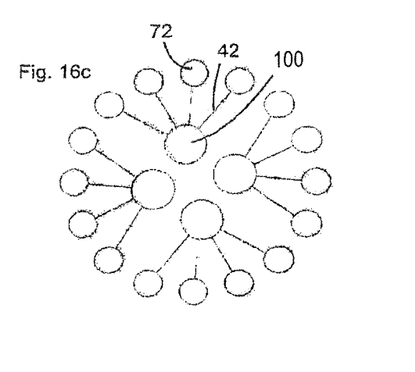
Figure 16D:
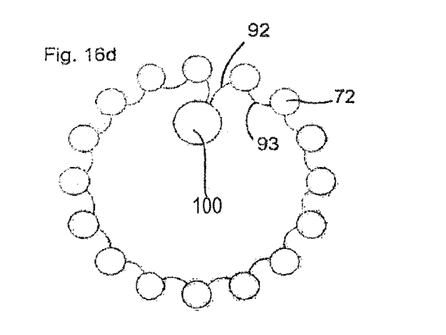

In the case of the situation shown in FIG. 16c a plurality of reservoirs 100 are provided, each of these reservoirs being associated in turn with a plurality of sterile room areas 72 by way of connecting lines 92. In the case of the embodiment shown in FIG. 16d all the room areas 72 are likewise associated with a reservoir 100, this reservoir 100 being connected in this case in terms of flow to only two sterile room areas 72 (i.e. also blow moulding stations 8) by way of two supply lines 92 and the individual room areas 72 being in turn connected to one another by intermediate lines 93.

It will be apparent to those skilled in the art that various modifications and variations can be made to the apparatus and method of shaping plastics material pre-forms into plastics material containers of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:
1. An apparatus for shaping plastics material pre-forms into plastics material containers, the apparatus comprising:
    a blow molding station arranged on a movable conveying device, the blow molding station having a blow mold forming a cavity in an interior of which the plastics material pre-forms are expandable by being acted upon with a gaseous medium in order to form the plastics material containers;
    a stressing device which acts upon the plastics material pre-forms with the gaseous medium in order to expand the plastics material pre-forms;
    a clean room which surrounds the blow molding station at least in part; and
    a stretching unit which stretches the plastics material pre-forms along a longitudinal direction of the plastics material pre-forms,
    wherein the stretching unit has a stretch bar which is movable with respect to the plastics material pre-forms and which is insertable into the plastics material pre-forms,
    wherein the blow molding station has a receiving space with at least one wall for receiving the stretch bar,
    wherein said receiving space surrounds the stretch bar at least in part and the stretch bar is movable with respect to said receiving space,
    wherein a flexible sealing device, which separates a sterile room area of the apparatus from a non-sterile room area of the apparatus, is arranged inside the receiving space,
    wherein the stretch bar moves permanently in the sterile room area,
    wherein the sealing device is designed in the form of a rolling diaphragm, the apparatus has a drive device for moving the stretch bar along a longitudinal direction thereof, said drive device being arranged outside the clean room,
    wherein the sealing device has a first end portion arranged in a stationary manner in the direction of movement of the stretch bar and a second end portion movable in the direction of movement of the stretch bar, and
    wherein the second end portion is mounted onto a carrier with no direct contact with the stretch bar, said carrier moving the stretch bar.

2. An apparatus according to claim 1, wherein a higher pressure is present in the sterile room area of the apparatus in a working operation of the apparatus than in the non-sterile room area.

3. An apparatus according to claim 2, wherein the apparatus has a reservoir for maintaining the pressure in the sterile room area, which reservoir is connected in terms of flow to the sterile room area.

4. An apparatus according to claim 3, wherein the reservoir associated with one blow molding station in each case.

5. An apparatus according to claim 1, wherein the second end portion is situated in the longitudinal direction for a time above the first end portion and/or for a time below the first end portion.

6. An apparatus according to claim 1, wherein the apparatus has at least one abutment area on which the sealing device rests flat at least for a time.

7. An apparatus according to claim 1, wherein the sealing device surrounds a room filled with a gaseous medium and separates it from an environment.

8. An apparatus according to claim 1, wherein a higher pressure is present in the sterile room area of the apparatus in a working operation of the apparatus than in the non-sterile room area, wherein the apparatus has a reservoir for maintaining the pressure in the sterile room area, which reservoir is connected in terms of flow to the sterile room area, and wherein the reservoir is designed in such a way that in the case of a rolling diaphragm the reservoir changes its respective volume in a manner dependent upon the position of the stretch bar.

9. An apparatus according to claim 1, wherein the receiving space surrounds the stretch bar substantially completely.

10. An apparatus according to claim 1, further including a linear drive for moving the carrier on which carrier a cylinder in turn is arranged.

11. An apparatus according to claim 10, wherein the flexible sealing device is also arranged on the cylinder, said flexible sealing device being in the form of a rolling diaphragm.

12. An apparatus for shaping plastics material pre-forms into plastics material containers, the apparatus comprising:
a blow molding station arranged on a movable conveying device, the blow molding station having a blow mold and said blow mold forming a cavity in an interior of which the plastics material pre-forms are configured to be expanded by being acted upon with a gaseous medium in order to form the plastics material containers;
a stressing device configured to act upon the plastics material pre-forms with the gaseous medium in order to expand the plastics material pre-forms;
a clean room which surrounds the blow molding station at least in part;
a stretching unit which stretches the plastics material pre-forms along a longitudinal direction of the plastics material pre-forms, the stretching unit including a stretch bar which is movable with respect to the plastics material pre-forms and which is configured to be inserted into the plastics material pre-forms, the blow molding station having a receiving space with at least one wall for receiving the stretch bar, said receiving space surrounding the stretch bar at least in part, and the stretch bar being movable with respect to said receiving space;
a flexible sealing device, which separates a sterile room area of the apparatus from a non-sterile room area of the apparatus, arranged inside the receiving space, wherein the stretch bar moves permanently in the sterile room area, wherein a pressure difference between the sterile area and the non-sterile area is between 0.2 bar and 4 bar, wherein the sealing device is in the form of a rolling diaphragm;
the apparatus further comprising a drive device for moving the stretch bar along the longitudinal direction thereof, the drive device being arranged outside the clean room,
wherein the sealing device has a first end portion arranged in a stationary manner in the direction of movement of the stretch bar and a second end portion movable in the direction of movement of the stretch bar, and
wherein the second end portion is mounted onto a carrier with no direct contact with the stretch bar, said carrier moving the stretch bar.

13. An apparatus according to claim 12, wherein a higher pressure is present in the sterile room area of the apparatus in a working operation of the apparatus than in the non-sterile room area.

14. An apparatus according to claim 13, further comprising a reservoir for maintaining the pressure in the sterile room area, said reservoir is being in flow connection with the sterile room area.

15. An apparatus according to claim 12, wherein the second end portion is situated in the longitudinal direction for a time above the first end portion and/or for a time below the first end portion.

16. An apparatus according to claim 12, further comprising at least one abutment area on which the sealing device rests flat at least for a time.

17. An apparatus according to claim 12, wherein the sealing device surrounds a room filled with a gaseous medium and separates it from an environment.

18. An apparatus according to claim 12, further including a linear drive for moving the carrier on which carrier a cylinder in turn is arranged.

19. An apparatus according to claim 18, wherein the flexible sealing device is also arranged on the cylinder, said flexible sealing device being in the form of a rolling diaphragm.

* * * * *